UNITED STATES PATENT OFFICE.

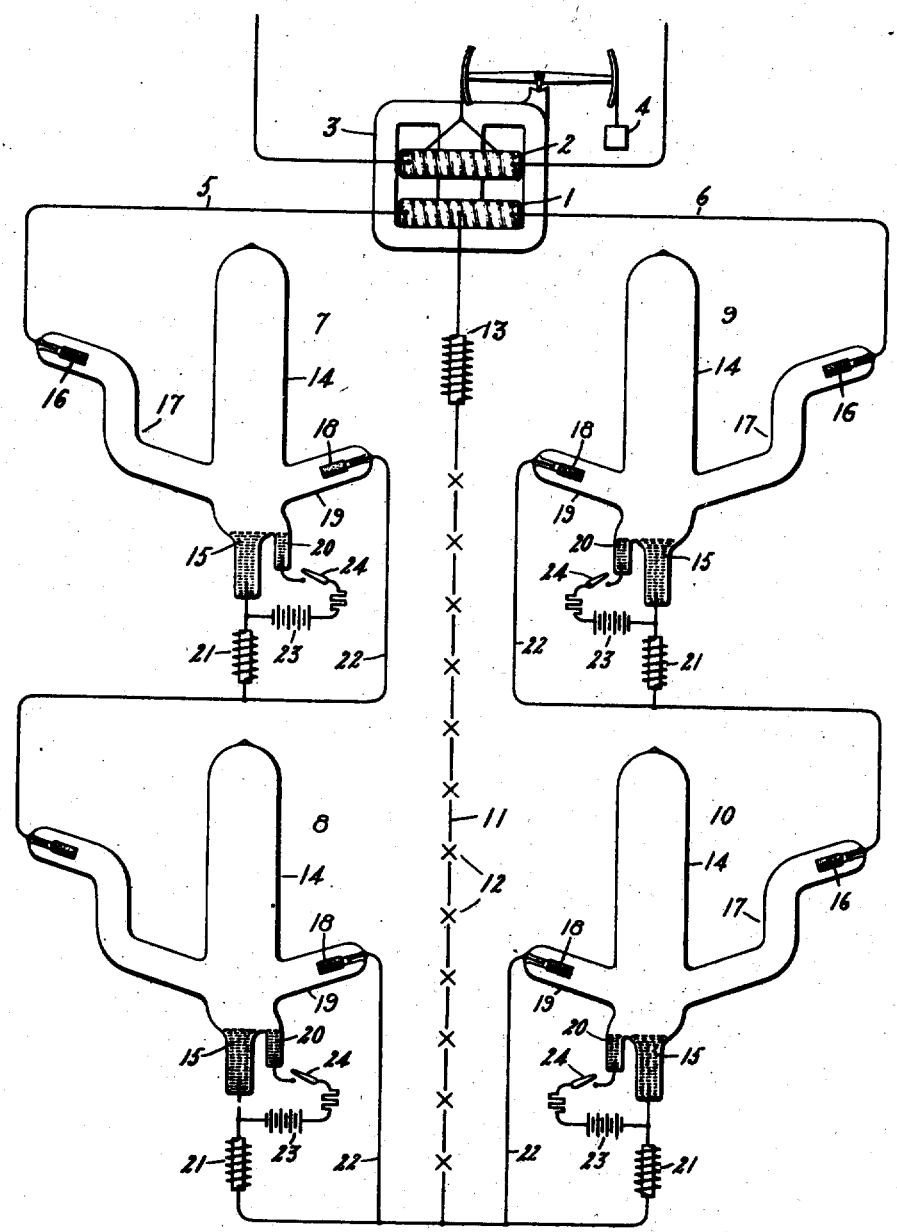

OSIAS O. KRUH, OF SCHENECTADY, NEW YORK, ASSIGNOR TO GENERAL ELECTRIC COMPANY, A CORPORATION OF NEW YORK.

RECTIFIER SYSTEM.

No. 897,544.　　　Specification of Letters Patent.　　　Patented Sept. 1, 1908.

Application filed November 9, 1905. Serial No. 286,505.

*To all whom it may concern:*

Be it known that I, OSIAS O. KRUH, a subject of the Emperor of Austria-Hungary, residing at Schenectady, county of Schenectady, State of New York, have invented certain new and useful Improvements in Rectifier Systems, of which the following is a specification.

My present invention relates to means for rectifying alternating-current, and more especially to a rectifier system for high voltage alternating-current.

The rectifying devices used in the system to which my invention relates are all of a type now known in the art as mercury arc rectifiers, and briefly characterized, consist each of an exhausted glass envelop or container having electrodes therein, of which one at least is usually of mercury. During the operation of such rectifiers a unidirectional flow of current takes place between the mercury electrode and the other electrode or electrodes, which flow of current is conveyed by an arc and is unidirectional in character. There sometimes exists a tendency for that electrode or electrodes which serves as the positive terminal of the arc discharge, to reverse momentarily in function so as to form the seat of a reverse flow of current either to a companion positive electrode or to the liquid negative electrode. This tendency becomes all the more marked at high voltages and is one of the features to be guarded against in the rectification of high voltage alternating current. In order to overcome this trouble I connect a number of rectifiers in series with each other, and this I find removes almost absolutely any chance for arc moves to take place, since for such arcing to occur it is necessary that the arcing occur simultaneously in all of the series connected rectifiers, which is a condition almost forbidden by the laws of chance.

The features of novelty which characterize my invention I have pointed out with particularity in the appended claims. The invention itself, however, will be better understood by reference to the following description taken in connection with the accompanying drawings, which represent one embodiment of my invention.

The alternating-current which is to be rectified is supplied from the secondary winding 1 of a constant-current transformer. The primary winding is indicated at 2 and the core at 3. The primary winding is partly counter-balanced by a weighted lever 4. The representation in the drawing is largely diagrammatic and it is to be understood that any suitable source of constant-current may be employed. Moreover, it is by no means essential for practicing my invention that a source of constant-current should be employed, though I have represented such a source in the drawings because my invention is especially adapted to the rectification of the high voltage generally derived from such a transformer, which voltage is generally utilized for supplying series arc light circuits.

Two sets of rectifiers are used for rectifying the current from the secondary 1, one set being connected in series with the lead 5 extending from one terminal of the secondary, and the other set in series with the lead 6 extending from the other terminal. The rectifiers in series with the lead 5 are indicated at 7 and 8, while those in series with the lead 6 are indicated at 9 and 10. The rectifiers 7 and 8 are in series with each other, while the rectifiers 9 and 10 are similarly connected in series. Each set of rectifiers finds a return circuit for its rectified current through the conductor 11 connected to the middle or other intermediate point of the secondary 1. The translating devices, ordinarily arc lamps, are connected in series with this return conductor as indicated at 12. Each set of rectifiers rectifies one-half wave of the alternating-current, and suppresses the other half wave. Both sets of rectifiers together, however, rectify both half waves and thus supply the load circuit with an unbroken succession of unidirectional waves of current. To smooth out the rectified current in the load circuit and make it as nearly constant as possible, an inductance coil 13 may be placed in series therewith.

The style of rectifier necessary for carrying out my invention may vary widely in practice. One form which I have found satisfactory I have shown at 7, 8, 9 and 10. The rectifiers thus indicated, being duplicates of each other, a description of one will suffice for all.

Referring to the rectifier 7, the same will be seen to consist mainly of an envelop or container 14, usually of glass, highly exhausted, and provided with electrodes. The part to which the numeral 14 applies is the condensing chamber for the surplus mercury vapor produced during operation of the apparatus. The vaporizable electrode or cathode of mercury is indicated at 15. The main anode is shown at 16 and consists of a cylinder or plate of artificial graphite or the like located in a zig-zagged extension 17 of the rectifier tube. An auxiliary electrode also of graphite is indicated at 18 and the same is located in an extension 19 of the rectifier tube. A small starting electrode 20 of mercury is arranged near the cathode 15.

In connecting the rectifier in circuit the lead 5 is connected to the main anode 16. The cathode 15 is connected by a conductor which extends to the next rectifier 8 in the series. In circuit with this conductor an inductance coil 21 is located. A lead 22, connected below this inductance coil, extends to and is connected with the auxiliary electrode 18. A small storage battery 23, or any other suitable source of direct current, may temporarily be connected through a current limiting resistance, as by the switch 24, between the cathode and the starting electrode 20. When thus connected a slight shaking or tilting of the rectifier tube will suffice to start an arc between these two mercury electrodes. The direction of current is chosen to make the electrode 15 the negative electrode.

Let it be assumed that the starting arcs in both of the rectifiers 7 and 8 are set into operation. Both rectifiers thereby become conductive for current pulsations of a direction to pass in series through the two rectifiers from anode to cathode of each rectifier. These current pulsations induce electromotive forces in the inductance coils such as 21. The main waves of current start from zero, rise to a maximum and fall to zero, which operation is repeated every alternate half period. As the current falls from its maximum volume the voltage of the inductance coil is in the same direction as the current flow. This voltage sets up a current in the circuit provided by the anode 18 and thereby produces an arc between this anode and the cathode 15, which arc by the discharge of energy stored in the inductance coil bridges over the half wave period during which no current flows in the supply main 5. The rectifier thus becomes self-sustaining and after once being set into operation by the starting arc from the electrode 20, will continue to operate independently of its starting arc. The starting arc, when the apparatus is once going, may be cut out of circuit. Of course, other methods of starting the rectifier may be employed if desired, since the particular manner of starting is not important so far as concerns the broad features of my invention. All of the rectifiers after being started up as above described, supply current to the return circuit 11, which current is smoothed out by the inductance coil 13.

In each of the main supply leads 5 and 6 extending from the transformer secondary, I have shown two rectifiers as connected in series with each other. Each of the rectifiers has its main anode, as for example the anode 6, located in the farther end of a zig-zagged tube to minimize any arcing tendency.

What I claim as new, and desire to secure by Letters Patent of the United States, is,—

1. The combination of a source of alternating-current, main conductors extending therefrom, a return conductor also extending therefrom, and a plurality of vapor electric rectifying devices in each of said main conductors.

2. The combination of a source of alternating-current, main conductors extending therefrom, a return conductor also extending therefrom, and a plurality of vapor electric rectifiers in series in each of said main conductors.

3. The combination of a source of alternating-current, mains extending therefrom, and a plurality of rectifiers in series in one at least of said mains, each of said rectifiers having a cathode and a plurality of anodes.

4. The combination of a source of alternating-current, mains extending therefrom, and a plurality of rectifiers in series with one of said mains, each of said rectifiers being self-exciting.

In witness whereof, I have hereunto set my hand this 8th day of November, 1905.

OSIAS O. KRUH.

Witnesses:
BENJAMIN B. HULL,
MARGARET E. WOOLLEY.